Figure 1:
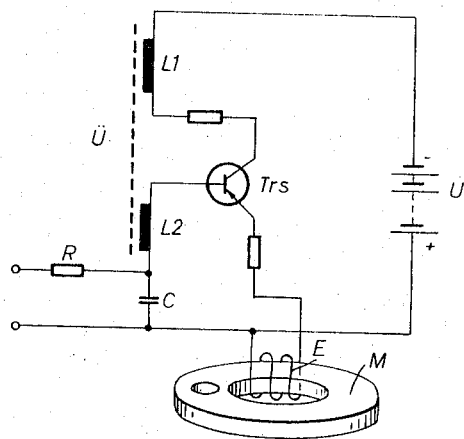

Jan. 3, 1967  O. KOLB  3,296,454
CONTROL CIRCUIT FOR SETTING THE FLUX
OF A MAGNETIZABLE ELEMENT
Filed June 12, 1962

INVENTOR
O. KOLB

BY *[signature]*
ATTORNEY

United States Patent Office 3,296,454
Patented Jan. 3, 1967

3,296,454
CONTROL CIRCUIT FOR SETTING THE FLUX
OF A MAGNETIZABLE ELEMENT
Otmar Kolb, Stuttgart-Weil im Dorf, Germany, assignor to International Standard Electric Corporation, New York, N.Y., a corporation of Delaware
Filed June 12, 1962, Ser. No. 201,995
Claims priority, application Germany, June 13, 1961, St 17,942
4 Claims. (Cl. 307—88)

This invention relates to a method for magnetizing an element (transfluxor) by means of a large number of equal permanent flux variations.

This is an improvement over my earlier joint invention covered by Wollmann et al., U.S. Patent 3,204,224, granted August 31, 1965, and assigned to the assignee of this invention. Wollmann et al. shows the type of equipment which is commonly used as logic circuitry in the computer art. That logic type of equipment, in effect, acts somewhat in the nature of a computer for analyzing the magnetic flux excursion which is often described by a hysteresis loop. Responsive to a detection of the knee of a hysteresis loop as a result of this analysis, Wollmann et al. generate a pulse having a predetermined volt-second content for driving a magnetic flux core device.

This, my sole invention, eliminates the need for the logic circuit-computer-analysis type of approach. Instead of that, I now provide a self-quenching circuit which is triggered by a magnetic flux change of the type which occurs at the knee of a hysteresis loop. This triggering action then causes the generation of a pulse having a uniform volt second content.

For convenience of expression, I describe the circuit used in my present sole invention as a "unitary self-quenching circuit." The term "unitary" is intended to distinguish the presently described automatic action over the logic circuit-computer-analysis type of action described by Wollmann et al. Those skilled in the art will readily perceive the scope of this term as used in my sole disclosure by comparing the disclosure in my prior art joint invention, Wollmann et al. patent, with this disclosure. In intent, by the term "unitary," to cover the entire range of equivalents due my sole invention and to exclude the range of equivalents due my joint invention.

According to the invention means are provided for detecting the time of transition in the element from the reversible flux variation to the irreversible flux variation. This detection causes equal setting pulses for effecting equal permanent flux variations.

According to one prior art embodiment of the method the setting is carried out by way of a flux imprintment. The setting current is differentiated, so that at the time of transition between the reversible flux variation and the irreversible flux variation (i.e. when the otherwise practically linear current rise characteristic represents a bend) there is produced a pulse which allows the setting pulse to continue for a defined period of time from the time position of its appearance onwards.

Another prior art embodiment of the invention is based on the recognition that at the time position of appearance of this pulse there has already been effected an irreversible flux variation and that it is thus unnecessary for the setting pulse to continue.

All of these setting methods, however, have the common disadvantage that the circuit arrangement for carrying out the method is relatively expensive, because besides the magnetizable element and the pulse generator, there are still required a differentiating arrangement as well as a switching device.

This expenditure is reduced by the present invention, which relates to a method of setting the permanent flux of a magnetizable element (transfluxor) with a nearly rectangular hysteresis loop. The invention uses one or more setting pulses having edges (slopes) where the potential rises steeply as compared to the time constant of the setting circuit. These pulses are applied to one setting winding. Each of the setting pulses causes an equal variation of the permanent flux because the beginning of the effective portion of the setting pulse is caused by the sudden variation of the self-induction coefficient at the break point (bend) of the hysteresis loop. This break point occurs when the flux is changing from the reversible to the irreversible edge, and there is a variation of the current rise. This variation serves to determine the portion of the setting pulse which is effective for setting the permanent flux. The various stages of permanent flux variations are equal among each other and have a predetermined, if necessary, very small magnitude.

The invention is based on the recognition that a setting pulse is terminated by the variation of the induced inverse voltage. This voltage appears at the setting winding due to the suddent variation of the self-induction coefficient at the break point. Thus, the duration of the setting pulses produced by the pulse generator and used for the flux imprintment is determined merely by the delay times built into the circuit arrangement itself. This delay time occurs between the appearance of the inverse voltage variation and the end of the setting pulse. According to the invention, this is accomplished in that the setting winding of the magnetizable element is inserted in such a way as an inductance into the pulse generator the sudden variation of the inverse voltage. This inverse voltage is used to terminate the pulse produced by the pulse generator.

Figure 2:
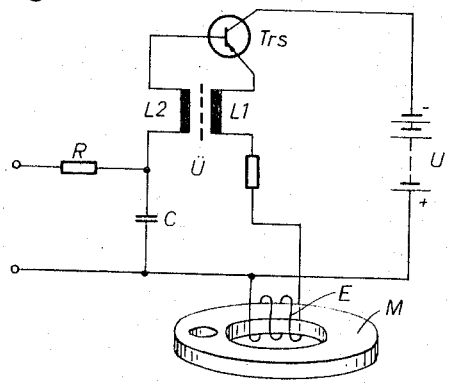

In the following the invention will now be explained in detail with reference to FIGS. 1, 2 and 3 of the accompanying drawings:

FIGS. 1 and 2 show two exemplary circuit arrangements for carrying out the method. Each of these circuits uses a blocking oscillator in conjunction with the setting winding of the magnetic element; and FIG. 3 is a hysteresis loop here used for explaining terms which appear in the following specification.

Figure 3:
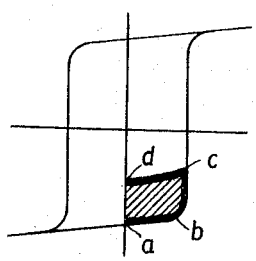

A hysteresis loop is included in FIG. 3 of the drawing to help explain terms used in this specification. Those skilled in the art will recognize this loop as a representation of the flux excursion of a "square loop" magnetic core element. The hatched area represents the flux change caused by a voltage pulse applied to a winding on the element. The area of the hatched section depends upon the volt second content of the pulse.

A characteristic of such an element is that current through a winding builds an electromagnetic field having flux which changes, as represented at $a, b$. After the electromagnetic field of the winding reaches the knee of the hysteresis loop (point $b$), the flux begins to change in the core itself, as represented at $a, d$. The curve $b, c$ is the resultant from an addition of $a, b$ and $a, d$. When current ceases to flow through the winding, the electromagnetic field collapses, as represented at $c, d$; hence the flux change $a, b$ is herein called "reversible." However, even after the current ceases to flow, the core flux retains the change which the current caused in it, as represented at $a, d$; hence, the flux change $a, d$ is herein called "irreversible." The point $b$ (called a "break") appears where the flux changes from reversible to irreversible. The abrupt change at the break causes an inverse voltage in the setting winding owing to a change in the self-induction coefficient of the winding.

Referring now to FIG. 1 there is shown the simplified basic circuit diagram of an inventive type of pulse generator operating as a blocking oscillator. In this drawing, Trs indicates a transistor of the pnp-type, L1 and L2 the windings of a transformer, with L1 being connected to the collector electrode, and L2 to the base electrode of the transistor in a way which satisfies a feedback requirement. With its other end, L1 is applied to the negative pole. With respect to alternating current, the other end of winding L2 is linked, via the capacitor C, to the positive pole of the supply voltage U. The pulse repetition rate (frequency) of this blocking oscillator is determined by the self-inductances of the transformer in conjunction with the series-arranged resistors and the capacitor C. By using suitable biasing potentials, the pulse generator can be switched on and off by way of shifting the operating point across the resistor R. The setting winding E of the magnetizable element M is now positioned within the emitter circuit of the transistor Trs.

An inverse voltage appears at this setting winding E when the electromagnetic field collapses, points c, d. This voltage acts as a reverse feedback. Since in the reversible portion of the hysteresis loop of the magnetizable element, the self-inductance coefficient is relatively small compared to that of the irreversible portion, there will appear, as an induced voltage in the reversible portion, a substantially lower feedback voltage than in the irreversible portion of the hysteresis loop. The feedback conditions of the blocking oscillator are so dimensioned that a starting of the oscillations is effected in the reversible portion in spite of this feedback. However, the oscillations stop at the substantially stronger feedback in the irreversible portion of the hysteresis loop. Thus, each pulse of the blocking oscillator will be interrupted at the break point (bend) between the reversible and the irreversible portion of the characteristic.

FIG. 2 shows a further modification of a blocking oscillator with the transformer windings L1, L2 being arranged in the base and emitter circuit of the transistor Trs. The setting winding E of the magnetizable element M is arranged in series with the transformer winding in the emitter circuit. Otherwise the mode of operation of this circuit arrangement is fully identical to that of the arrangement shown in FIG. 1.

It is obvious that the principle on which the invention is based, is in no way restricted to the two shown types of embodiment only, but may be applied to all oscillator circuits in which the setting winding is capable of being inerted in such a way that, in the reversible portion of the hysteresis loop of the magnetizable element, the reverse feedback caused by the induced inverse voltage, is still low enough to effect a starting of the oscillation, while being high enough in the irreversible portion to cause an interruption of the oscillations.

In cases where the inverse voltage, appearing after the break point within the irreversible portion of the hysteresis loop at the setting winding, is not high enough to cause a stopping of the oscillation of the pulse generator, this voltage may be amplified and fed to the pulse generator as a reverse feedback.

In view of the fact that the reversible portion which is to be passed through, becomes always longer as the permanent flux increases—the magnetizable element, as is known, only has an approximate and not an exactly rectangular hysteresis loop—also the total pulse will always become somewhat longer in the course of time, although the portion responsible for effecting the permanent flux remains constant. Thus, a pulse generator of the type described, at the same time also represents an arrangement for transmitting a number of pulses of which each following one is by a certain time interval longer than the preceding one.

While I have described above the principles of my invention in connection with specific apparatus, it is to be clearly understood that this description is made only by way of example and not as a limitation to the scope of my invention as set forth in the objects thereof and in the accompanying claims.

What is claimed is:

1. A control circuit for setting the flux in a magnetic counting element having at least a rectangular hysteresis loop core with a winding thereon, said control circuit comprising a unitary self-quenching circuit means having inherent characteristics such that said circuit turns on and current thereafter flows for an indefinite period of time and then turns off automatically a predetermined period of time after an occurrence of an electrical signal, means responsive to the receipt of an input signal for causing said self-quenching circuit to turn on and energize said winding to change the flux of said element over a reversible and an irreversible excursion, means responsive to the break at the hysteresis knee between said reversible and irreversible flux excursions for causing a self-induced voltage change in said winding, means responsive to said induced voltage change for giving said electrical signal to said self-quenching circuit, thereby starting said predetermined period of time, and means thereafter responsive only to the inherent characteristics of said self-quenching circuit for automatically terminating the energization of said winding at the end of said predetermined time period.

2. The control circuit of claim 1 wherein said circuit means for energizing said winding comprises oscillator means, and means for interrupting the oscillations of said oscillator responsive to said voltage change.

3. The control circuit of claim 2 and means for applying said voltage change to said oscillator as a reverse feed back.

4. A control circuit for setting the flux of a saturable reactor having a winding and a rectangular hysteresis loop core comprising self-quenching circuit means responsive to an input voltage pulse for energizing said winding to change the flux of said reactor over a reversible and an irreversible excursion along the hysteresis loop, means responsive to the break between said reversible and irreversible excursions for causing a self-induced voltage change in said winding, means responsive to said voltage change for terminating the input pulse after a delay time which is determined by the inherent self-quenching characteristics of the circuit applying the pulse, said circuit means for applying said pulses comprising a blocking oscillator means, means for applying said voltage change to said oscillator as a reverse feed back, and means for interrupting the oscillations of said oscillator responsive to said voltage change.

References Cited by the Examiner

UNITED STATES PATENTS

| 2,968,796 | 1/1961 | Lane | 340—174 |
| 3,037,130 | 5/1962 | Rugaber | 307—88 |
| 3,117,235 | 1/1964 | Young | 307—88 |
| 3,121,800 | 2/1964 | Daykin | 307—88 |
| 3,204,224 | 8/1965 | Wollmann | 340—174 |

BERNARD KONICK, *Primary Examiner.*

IRVING SRAGOW, *Examiner.*

M. S. GITTES, R. G. LITTON, *Assistant Examiners.*